United States Patent [19]

Shioda et al.

[11] 4,385,324

[45] May 24, 1983

[54] WIDE SCREEN IMAGE PROJECTION APPARATUS

[75] Inventors: Takizo Shioda, Tokyo; Norio Ito, Kanagawa; Katsumi Kobayashi, Tokyo, all of Japan

[73] Assignee: Sony Corporation, Tokyo, Japan

[21] Appl. No.: 321,763

[22] Filed: Nov. 16, 1981

Related U.S. Application Data

[63] Continuation of Ser. No. 145,793, May 1, 1980, abandoned.

[30] Foreign Application Priority Data

May 8, 1979 [JP] Japan ............................... 54-60732[U]

[51] Int. Cl.³ .................. H04N 5/74; H04N 3/22; H04N 3/36
[52] U.S. Cl. .................................. 358/237; 358/180; 358/214

[58] Field of Search ............... 358/54, 60, 127, 97, 358/180, 214-216, 237, 242; 315/395; 360/33

[56] References Cited

U.S. PATENT DOCUMENTS

| 3,097,262 | 7/1963 | Ehrenhaft | 358/180 |
| 4,028,726 | 6/1977 | Argy | 358/180 |
| 4,037,250 | 7/1977 | McGahan | 358/108 |

Primary Examiner—John C. Martin
Attorney, Agent, or Firm—Lewis H. Eslinger; Alvin Sinderbrand

[57] ABSTRACT

An image display apparatus having a cathode ray tube with a deflection device, a projection screen and a projection lens projecting an image from the picture screen of the cathode ray tube onto the projection screen, is further provided with a deflection width control device which changes a dimension particularly the width of the cathode ray tube raster, in response to a change in the type of a television signal supplied to the tube.

10 Claims, 16 Drawing Figures

WIDE SCREEN IMAGE PROJECTION APPARATUS

This is a continuation of application Ser. No. 145,793, filed May 1, 1980, now abandoned.

BACKGROUND OF THE INVENTION

1. Field of the Invention

The present invention relates generally to an image display apparatus, and is directed more particularly to an image display apparatus for projecting onto a projection screen an enlargement of an image reproduced on the picture screen of a cathode ray tube.

2. Description of the Prior Art

It has been proposed to provide an image display apparatus of the projection type, which, as shown on FIG. 1 of the drawings, consists of a cathode ray tube 1 for providing the image to be projected, a reflecting mirror 2, a lens 3 and a projection screen 4. An enlargement of the image reproduced on the picture screen of cathode ray tube 1 is projected through the mirror 2 and lens 3 onto the projection screen 4. In this case, a cathode ray tube of high brightness is used as the cathode ray tube 1.

In general, it is known that a screen which is wide in the lateral direction is coincident with a man's visual field, rich in ambience and capable of interesting visual effects as in Cinemascope (Trade Name) and so on. Thus, it is desired that a projection type display apparatus be capable of producing a wide picture.

In the art, however, since the television video signal of the standard system is selected such that its picture screen size is 3:4 in aspect ratio, the picture projected on the screen 4 from the cathode ray tube 1 in the display apparatus is also 3:4 in aspect ratio, if the prior art display apparatus is not modified.

OBJECTS AND SUMMARY OF THE INVENTION

Accordingly, an object of the present invention is to provide a novel image display apparatus.

Another object of the invention is to provide an image display apparatus which can produce a picture that is longer in lateral length than the standard television picture.

According to an aspect of the present invention, an image display apparatus is provided which comprises:

a cathode ray tube including a picture screen and deflection means by which an electron beam is made to scan the picture screen in a raster for forming an image on the picture screen;

a projection screen;

a projection lens for projecting the image from the picture screen of said cathode ray tube onto said projection screen; and deflecting width control means for changing a dimension of the raster in response to a change in the type of television signals applied to the tube.

The above, and other objects, features and advantages of the present invention, will become apparent from the following description which is to be used in conjunction with the accompanying drawings in which the same reference numerals are used to desigate the same elements and parts.

DESCRIPTION OF THE PREFERRED EMBODIMENTS

The present invention will now be described with particular reference to FIG. 2 in which an image picked up by a video camera is viewed directly on a projection screen. In accordance with this invention, the cathode ray tube 1 which is used has a vertical deflection width or vertical dimension of its raster which is narrower than that of an ordinary cathode ray tube, that is, the vertical dimension of the raster of tube 1 is smaller than the vertical dimension of the effective picture screen (approximately corresponding to the picture screen of the cathode ray tube). Further, the horizontal deflection width or horizontal dimension of the raster of the cathode ray tube 1 can be changed between a first state, in which the horizontal deflection width is narrow to provide a raster with an aspect ratio which is still 3:4 in spite of the narrow vertical deflection width, and a second state in which the horizontal deflection width is made to cover the full horizontal width of the effective picture screen or even more.

Figure 1:
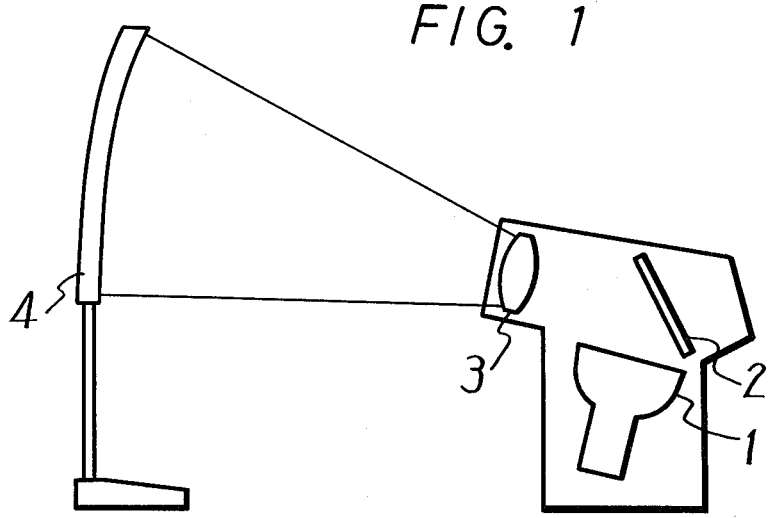
FIG. 1 is a schematic diagram showing an image display apparatus of the prior art.
Figure 2:
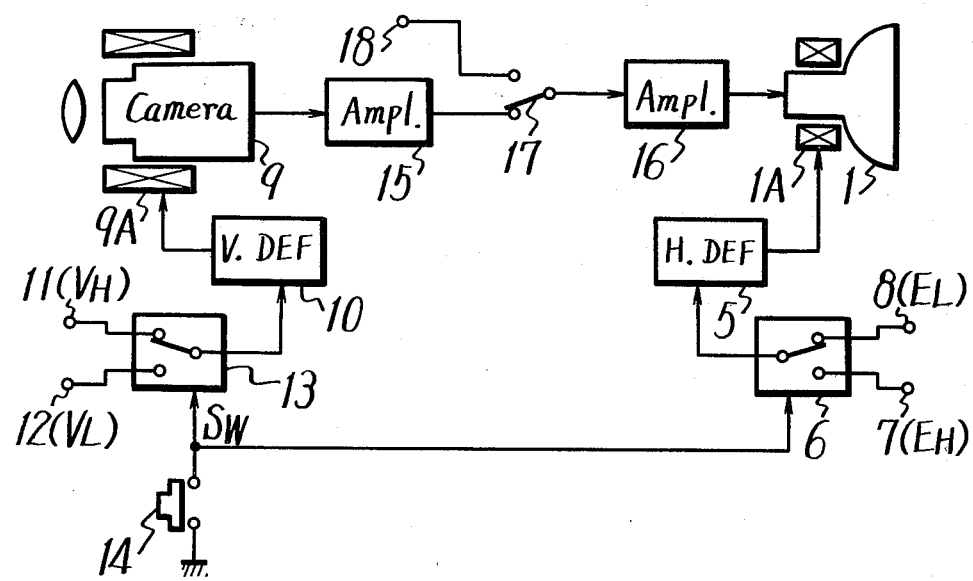
FIG. 2 is a systematic block diagram showing an embodiment of the present invention.

In FIG. 2, 1A designates a deflection yoke with a horizontal deflection coil which is supplied with the deflection current from a horizontal deflection circuit 5. A switch circuit 6 is provided which selectively supplies to circuit 5 either a relatively high voltage $E_H$ appearing at a terminal 7 or a voltage $E_L$, lower than the voltage $E_H$, and appearing at a terminal 8. Thus, by changing-over switch circuit 6, the power voltage for deflection circuit 5 is changed and hence the horizontal deflection width of cathode ray tube 1 is similarly changed. For example, when the switch circuit 6 is switched to the position opposite to that shown in FIG. 2 and hence the voltage $E_H$ is applied to the horizontal deflection circuit 5, the horizontal deflection width of cathode ray tube 1 is made to substantially correspond to the full length of its effective picture screen in the horizontal direction.

In the embodiment of FIG. 2, a video camera 9 is provided with a vertical deflection yoke 9A and a vertical deflection circuit 10 which supplies a vertical deflection current to the yoke 9A. In the video camera 9, the horizontal deflection width or horizontal dimension of the raster on its target surface is selected to be equal to that of an ordinary video camera, but the vertical deflection width thereof is changed over between a width equal to that of an ordinary camera and a vertical width smaller than the ordinary one. For effecting such change in the vertical dimension of the raster on the target surface of camera 9, a voltage $V_H$ appearing at a terminal 11 and a voltage $V_L$, which is lower than voltage $V_H$ and appears at a terminal 12, are selectively applied through a switch circuit 13 to the vertical deflection circuit 10. Thus, the vertical deflection width of video camera 9 is changed, when the switch circuit 13 is actuated or changed over. For example, when switch circuit 13 is change to the position opposite to that shown in FIG. 2, the vertical deflection width of video camera 9 is reduced.

The switch circuits 6 and 13 are simultaneously changed over by a switch signal $S_W$. When a push button switch 14 is open or in its OFF state, the switch signal $S_W$ is "1", and the switch circuits 6 and 13 are changed over to the positions shown in FIG. 2. When the push button 14 is actuated or depressed to its ON state, the switch signal $S_W$ is "0", and the switch circuits 6 and 13 are changed over to positions opposite to those shown in FIG. 2.

In FIG. 2, the reference numerals 15 and 16 designate amplifiers, respectively, and a change-over switch 17 is provided to selectively apply to the input of amplifier 16 either the output of amplifier 15, or a detected signal corresponding to the standard television signal and which is supplied to a terminal 18.

The projection screen (not shown in FIG. 2) on which an image reproduced on the cathode ray tube 1 is to be projected is formed so as to have a lateral dimension longer than that which would provide the aspect ratio 3:4.

Figure 3A:
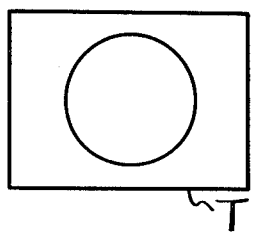
FIGS. 3A-3D and 4A-4D are schematic diagrams used for explaining the operation of the embodiment shown in FIG. 2.
Figure 3B:
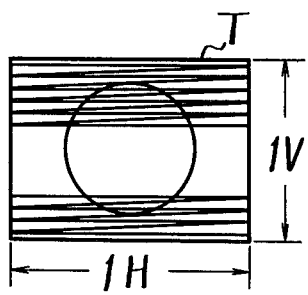

The operation of the image display apparatus shown in FIG. 2 will now be described. When the switch 17 is changed over to the position shown in the figure, the video signal delivered from the camera 9 is supplied through the amplifiers 15 and 16 to the cathode ray tube 1. In this state, if the push button switch 14 is open or OFF so that the switch signal $S_W$ is "1", the switch circuit 13 is changed over to the position shown in FIG. 2, so that the vertical deflection width of camera 9 is a dimension similar to that of an ordinary camera. Accordingly, if an object (not shown) in the field of view of camera 9 is a true circle, the image thereof focussed on a target surface T of camera 9 is as shown in FIG. 3A. In this case, the target surface T of camera 9 is scanned with a raster having horizontal and vertical deflection widths or dimensions similar to those of an ordinary camera, as shown in FIG. 3B. Therefore, the camera 9 delivers a video signal which is the same as that of the standard system, and which is supplied through the amplifier 15, switch 17 and amplifier 16 to the cathode ray tube 1.

Figure 3C:
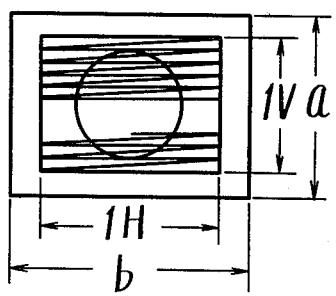

Since the switch signal $S_W$ is "1", the switch circuit 6 is also changed over to the position shown in FIG. 2, with the result that the horizontal deflection width of cathode ray tube 1 is narrower than that of the ordinary or conventional tube. Accordingly, if the effective picture screen of cathode ray tube 1 is selected to have such a size that its vertical dimension or height is a and its lateral dimension or width is b as shown in FIG. 3C, the vertical and horizontal deflection widths of the raster of cathode ray tube 1 at this time are shorter than a and b, respectively, and, hence, an image of the kind shown in FIG. 3C is reproduced on the picture screen of cathode ray tube 1. The image reproduced on the picture screen of cathode ray tube 1 is projected with enlargement on a screen 4', which, as shown on FIG. 3D, has a lateral dimension or width greater than that which would provide the conventional height to width aspect ratio of 3:4. In this case, since the screen 4' is relatively long in its lateral (dimension), the horizontal width of the image displayed on the screen 4' is narrower than that of the screen 4' if the enlargement of the projected image is just sufficient to make the vertical dimension thereof equal to the vertical dimension of screen 4', and hence side portions 19 of the screen, which are indicated with cross-hatching on FIG. 3D, have no image thereon.

In contrast to the picture screen of a television receiver or cathode ray tube, the absence of any image from the side portions 19 of screen 4', is not disturbingly unnatural to the human visual sense as such side portions 19 of the projection screen extend beyond the sides of the 3:4 aspect ratio of the principal human field of view.

Figure 4A:
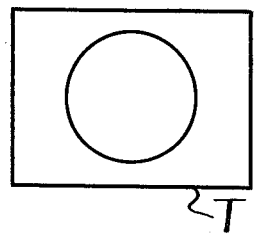
Figure 4B:
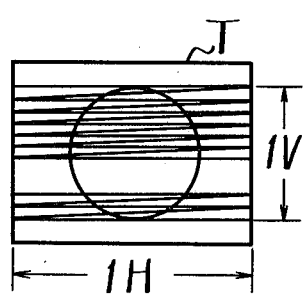

Next, there will be described the case in which the image picked up by the camera 9 is made into a projected picture having an increased lateral dimension by the embodiment shown in FIG. 2. In this case, the push button switch 14 is actuated or turned ON, with the result that the switch signal $S_W$ becomes "0" and, hence, the switch circuits 6 and 13 are both changed over to positions opposite to those shown in FIG. 2. Accordingly, the vertical deflection width or vertical dimension of the raster of camera 9 is made narrow, and hence an image focussed on the target surface T of camera 9, as shown in FIG. 4A, is scanned by the raster of reduced vertical dimension or vertical deflection width, as shown in FIG. 4B.

Figure 4C:
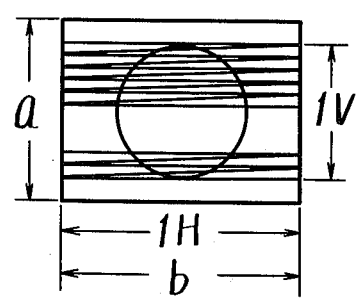

The video signal thus provided by the camera 9 is supplied to the cathode ray tube 1 through the amplifiers 15 and 16 and switch 17. At this time, however, the switch circuit 6 is changed over to a position opposite to that shown in FIG. 2 as described above, so that the horizontal deflection width is increased in cathode ray tube 1. Therefore, on the picture screen of cathode ray tube 1 there is reproduced an image which is decreased only in its vertical dimension, as shown in FIG. 4C.

Figure 4D:
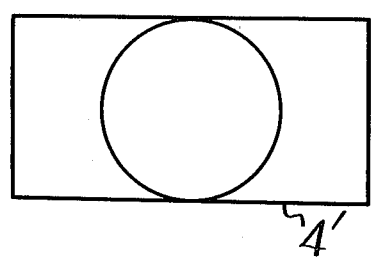

The image reproduced on the picture screen of cathode ray tube 1 is projected with enlargement on the screen 4', so that the image displayed on screen 4' is coincident with the latter both in width and height, as shown on FIG. 4D.

Figure 3D:
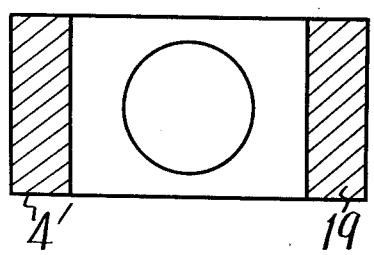

When the switch 17 is changed over to the position opposite to that shown in FIG. 2, the detected signal resulting from reception of the standard television broadcast signal is supplied from the terminal 18 through the amplifier 16 to the cathode ray tube 1. At this time, with the push button switch 14 turned OFF, there is reproduced, on the picture screen of cathode ray tube 1, an image which is smaller in size than the effective picture screen, as shown in FIG. 3C, with the result that on the screen 4', there is projected a picture which is 3:4 in aspect ratio, as shown in FIG. 3D.

It will be appreciated that, in the above described embodiment of the invention, an image display apparatus is provided which displays a picture of increased length in the lateral direction on the screen 4' merely by suitably varying the deflection voltages applied to the camera 9 and cathode ray tube 1.

Another embodiment of the invention will now be described with reference to FIG. 5. In this embodiment, the cathode ray tube 1 is the same as that used in the embodiment of FIG. 2, but an ordinary camera is employed as the camera 9 and its vertical deflection width is not changeable. When a wide picture is desired to be displayed on the projection screen 4', instead of changing the vertical deflection width of camera 9, an anamorphic lens 20 is used between an object (not shown)

and the pick-up lens of camera 9. When the anamorphic lens 20 is located between the object and camera 9, a signal obtained at a terminal 21 is suitably changed from "1" to "0". The change of the signal at terminal 21 from "1" to "0" causes the switch circuit 6 to change over to the position opposite to that shown in FIG. 5.

Figure 6A:
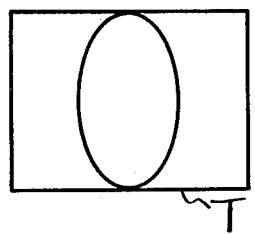
FIGS. 6A-6D are schematic diagram used for explaining the operation of the embodiment shown in FIG. 5.

When the object is picked up by the camera 9 through the anamorphic lens 20, an image, whose vertical height is unchanged but whose horizontal or lateral length is compressed, is focussed on the target surface T of camera 9. In other words, a visual field which is wider than usual to an extent corresponding to the compressed amount can be picked up by the camera 9, that is, an image expanded in the horizontal direction can be focussed on the target surface T of camera 9. Accordingly, if the object is a true circle, its image focussed on the target surface T of camera 9 becomes an ellipse elongated in the vertical direction, as shown in FIG. 6A.

Figure 5:
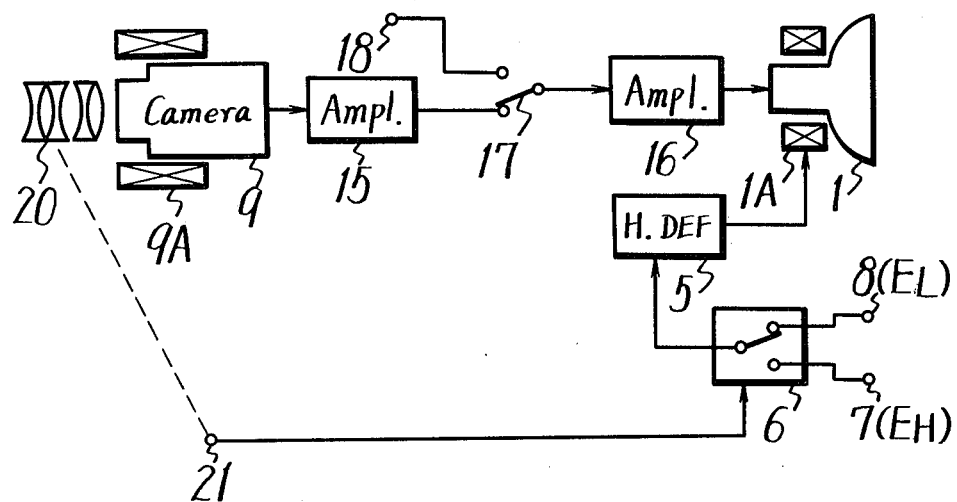
FIG. 5 is a systematic block diagram showing another embodiment of the invention.
Figure 6C:
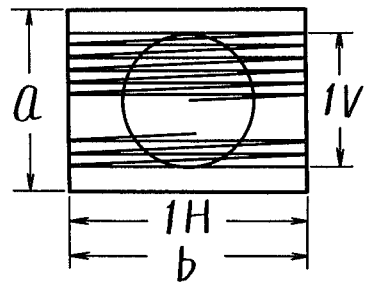
Figure 6B:
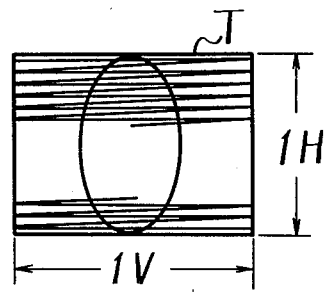

Since the horizontal and vertical deflection widths of camera 9 in FIG. 5 are the same as those of the ordinary camera, the image focussed on the target surface T is converted to a corresponding electrical signal when the target surface T is scanned over the full dimension thereof in both vertical and horizontal directions, as shown in FIG. 6B.

The video signal thus delivered from camera 9 is supplied through the amplifiers 15 and 16 to the cathode ray tube 1. Since the switch circuit 6 is changed over to the position opposite to that shown in FIG. 5 by the signal "0" at the terminal 21, the horizontal deflection width of cathode ray tube 1 is increased so as coincidental with the horizontal dimension b of the effective picture screen of the tube 1.

Figure 6D:
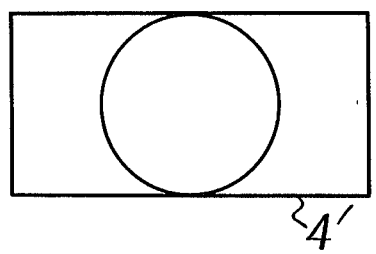

Since the vertical deflection or dimension of the raster of cathode ray tube 1 is smaller than the vertical dimension a of the effective picture screen, the image reproduced on the picture screen of cathode ray tube 1 has a vertical dimension which is narrower than that of the picture screen and a horizontal width which is extended wide to coincide with that of the picture screen. Thus, the ellipse focussed on the target surface T, and which is elongated in the vertical direction due to the compression in the horizontal direction, is reproduced on the picture screen of cathode ray tube 1 as a true circle as shown in FIG. 6C. This true circle is projected with enlargement onto the screen 4' so that the picture displayed on projection screen 4' coincides with the latter in all directions, and particularly is laterally elongated, as shown in FIG. 6D.

When the anamorphic lens 20 of FIG. 5 is not located between the object and camera 9 and a signal detected from the standard television broadcast signal is applied through the terminal 18 to the cathode ray tube 1, the image reproduced on the picture screen of cathode ray tube 1 both is smaller, in the horizontal and vertical directions, than the effective picture screen, for example, as shown in FIG. 3C with reference to the embodiment of FIG. 2, and hence side portions of the screen 4' are then devoid of the image similarly to the side portions 19 on FIG. 3D.

A further embodiment of the invention will be described with reference to FIG. 7. In this embodiment, the video signal from the camera 9 is recorded on a video tape recorder 22, and thereafter the video signal is reproduced by means of the same or another video tape recorder and is fed to the cathode ray tube 1, with the image reproduced thereon being projected onto the screen 4'.

Figure 7:
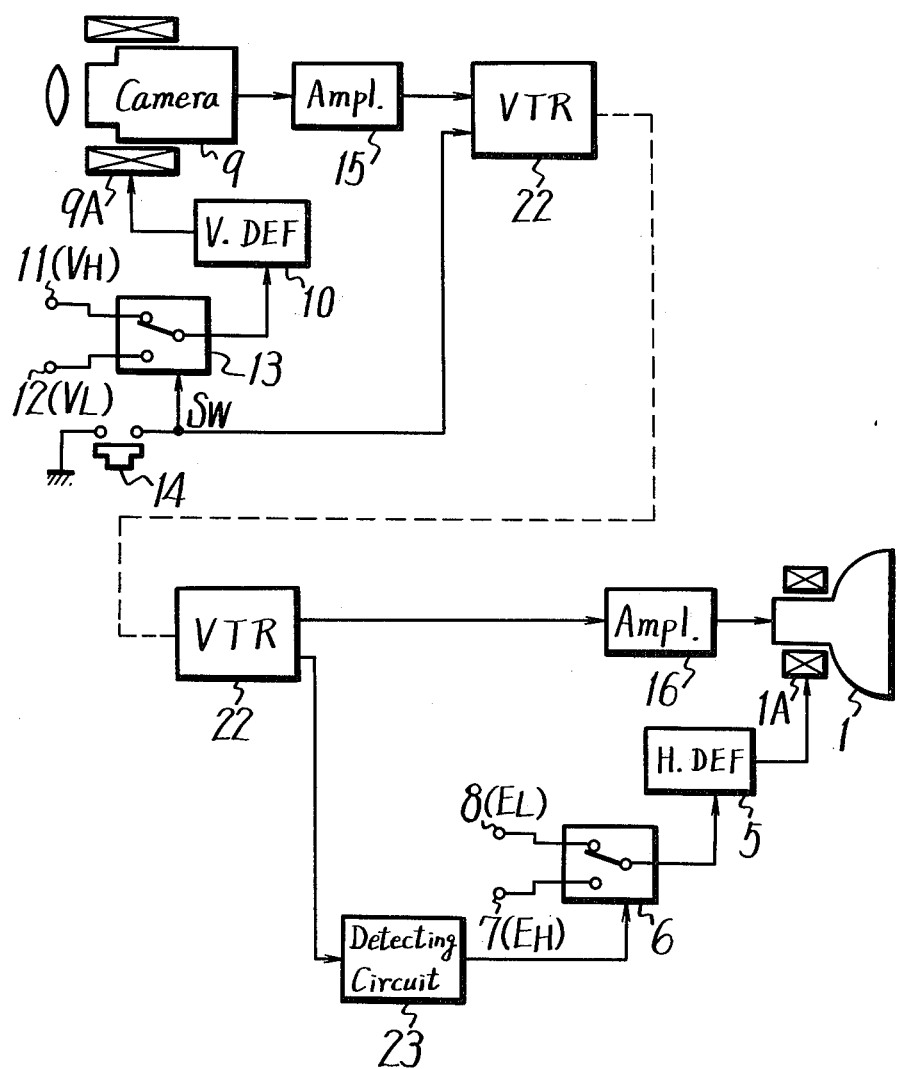
FIG. 7 is a systematic block diagram showing a further embodiment of the invention.

In the embodiment of the invention shown in FIG. 7, the deflection devices of the camera 9 and cathode ray tube 1 may be the same as those used in FIG. 2. The video signal from the camera 9 is recorded by the video tape recorder 22 in the usual slant tracks of the recording tape, and the switch signal $S_W$ for controlling the switch circuit 13 and which is controlled by actuation of the push button switch 14, is recorded on, for example, one of the audio tracks extending along a longitudinal edge of a tape used in the video tape recorder 22. Accordingly, when reproduction is carried out in the video tape recorder 22, the video signal is reproduced and the switch signal $S_W$ recorded on the audio track is also reproduced. The reproduced switch signal $S_W$ is detected by a detecting circuit 23 and the resulting detection signal is supplied to the switch circuit 6.

Accordingly, in the embodiment of FIG. 7, when the reproduced video signal is a standard video signal, the corresponding switch signal Sw causes change-over of the switch circuit 6 to the state shown in FIG. 7. However, when the reproduced video signal is a signal which is equivalently expanded in the vertical direction, the switch circuit 6 is changed over by the corresponding reproduced signal Sw to the state opposite to that shown in FIG. 7. Thus, a wide picture is displayed on the screen 4' similar to that shown on FIG. 4D.

In the embodiment of FIG. 7, it is possible that the switch signal $S_W$, rather than being recorded in on audio track, is recorded on the slant video signal track during the fly-back period of the video signal in superposed relation to the video signal or such switch signal Sw may be recorded on an end portion of the tape before the commencement of recording on the video signal.

As described above, according to the present invention, a picture, which is wider than the standard picture size of a television receiver, can be easily obtained, merely by changing only the deflection width. Thus, the conditions for displaying a picture with the aspect ratio 3:4 of the standard system or a wide picture can be automatically switched.

Although preferred embodiments of the invention have been described in detail herein with reference to the accompanying drawings, it will be apparent that the invention is not limited to such embodiments, and that many modifications and variations could be effected by one skilled in the art without departing from the spirit or scope of the invention as defined in the appended claims.

We claim as our invention:
1. An image display apparatus comprising:
 a cathode ray tube including a picture screen and in which an electron beam modulated with television signals is directed against said screen, and deflection means by which said electron beam is made to scan said picture screen in a raster for forming an image on said picture screen;
 a projection screen;
 projection lens means for projecting said image from said picture screen of said cathode ray tube onto said projection screen; and
 deflecting width control means for changing the horizontal width of said raster in accordance with a change in the type of said television signals, said deflecting width control means including first and second sources of relatively low and high horizon- tal deflecting voltages, respectively, means for detecting said changes in the type of television signals and producing as its output a control signal in response thereto, and horizontal selecting switch means for selectively connecting said first and second sources to said deflection means in response to said control signal.

2. An image display apparatus according to claim 1; in which said television signals for modulating said beam in said cathode ray tube are recorded on a record medium which also bears a recorded signal identifying the type of said television signals; and further comprising means for reproducing the television signals and the recorded signal identifying said type of the reproduced television signal, means for applying the reproduced television signals to said cathode ray tube, and means for applying the reproduced type-identifying signals to said means for detecting said change in the type of television signal.

3. An image display apparatus according to claim 1; further comprising:

camera means having a target on which an image of an object in the field of view of said camera means is projected and being operative to provide said television signals in response to said image on the target, and including a deflection means having a vertical deflecting coil and a vertical deflecting circuit for determining a vertical dimension of a raster with which said target is scanned;

means for changing the effective aspect ratio of the television signals provided by said camera means, including sources of relatively high and low vertical deflecting voltages, vertical selecting switch means for selectively applying said high and low vertical deflecting voltages to said vertical deflecting circuit;

means for controlling said vertical selecting switch means simultaneously with said deflecting width control means; and means for applying to said cathode ray tube said television signals provided by said camera means.

4. An image display apparatus according to claim 3; in which said means for controlling said vertical selecting switch means and said horizontal selecting switch means include control switch means actuable to provide a control signal, and said vertical and horizontal selecting switch means are simultaneously responsive to said control signal.

5. An image display apparatus according to claim 3; in which said means for applying to said cathode ray tube the television signals provided by said camera means includes means for recording said television signals from said camera means on a record medium and for reproducing said television signals from said record medium and applying the same to said cathode ray tube; said means for controlling said vertical selecting switch means includes control switch means actuable to provide a control signal to said vertical selecting switch means for operating the latter and to said means for recording and for reproducing so as to be recorded on, and reproduced from said record medium along with the respective television signals; and said means for controlling said horizontal selecting switch means includes detecting means for detecting the control signal reproduced from said record medium and for providing a corresponding control signal to said horizontal selecting switch means for operating the latter.

6. An image display apparatus comprising:

means for reproducing television signals recorded on a record medium along with a signal identifying the type of said television signals;

means for reproducing said signal identifying the type of said television signals;

a cathode ray tube including a picture screen and deflection means by which an electron beam is made to scan said picture screen in a raster for forming an image on said picture screen in response to supplying of the reproduced television signals to the cathode ray tube, said deflection means including a horizontal deflecting coil mounted on said cathode ray tube and a horizontal deflecting circuit;

a projection screen;

projection lens means for projecting said image from said picture screen of said cathode ray tube onto said projection screen; and deflecting width control means connected with said horizontal deflecting circuit for determining the horizontal width of said raster so that the raster has limited dimensions in both the vertical and the horizontal directions when reproduced television signals of a standard type are supplied to said cathode ray tube, and the raster has a limited dimension only in the vertical direction when reproduced television signals of a special type are supplied, said deflecting width control means including sources of relatively low and high horizontal deflecting voltages, selecting switch means for selectively connecting said sources to said horizontal deflecting circuit in response to a control signals, and means for detecting said reproduced signal identifying said type of said television signals and providing said control signal in response thereto for controlling said selecting switch means.

7. An image display apparatus comprising:

camera means having a target on which an image of an object in the field of view of said camera is projected and being operative to provide television signals corresponding to said image in response to the scanning of said target by an electron beam, deflection means having a vertical deflecting coil and a vertical deflecting circuit for determining the vertical dimension of a raster with which said target is scanned by said beam, and means for changing the effective aspect ratio of said television signals including sources of relatively high and low vertical deflecting voltages and first selecting switch means for selectively applying said high and low vertical deflecting voltages to said vertical deflecting circuit for obtaining standard and special types, respectively, of television signals from said camera means;

a cathode ray tube including a picture screen and deflection means by which an electron beam is made to scan said picture screen in a raster for forming an image on said picture screen in response to said television signals supplied from said camera means, said deflection means including a horizontal deflecting coil mounted on said cathode ray tube and a horizontal deflecting circuit;

a projection screen;

projection lens means for projecting said image from said picture screen of said cathode ray tube onto said projection screen;

deflecting width control means connected with said horizontal deflecting circuit for changing the horizontal width of said raster when television signals of said special type are supplied to said cathode ray tube, said raster having limited dimension in the vertical and horizontal directions when said signals of standard type are supplied to said cathode ray tube, said raster having a limited dimension only in the vertical direction when television signals of said special type are so supplied, said deflecting width control means including sources of relatively low and high horizontal deflecting voltages, second selecting switch means for selectively applying said low and high horizontal deflecting voltages to said horizontal deflecting circuit, and means for controlling said second selecting switch means in accordance with the control of said first selecting switch means.

8. An image display apparatus according to claim 7; in which said means for controlling said first selecting switch means and said second selecting switch means include control switch means actuable to provide a control signal, and said first and second selecting switch means are simultaneously responsive to said control signal.

9. An image display apparatus according to claim 7; in which said means for applying to said cathode ray tube the television signals provided by said camera means includes means for recording said television signals from said camera means on a record medium and for reproducing said television signals from said record medium and applying the same to said cathode ray tube; said means for controlling said first selecting switch means includes control switch means actuable to provide a control signal to said first selecting switch means for operating the latter and to said means for recording and for reproducing so as to be recorded on, and reproduced from said record medium along with the respective television signals; and said means for controlling said second selecting switch means includes detecting means for detecting the control signal reproduced from said record medium and for providing a corresponding control signal to said second selecting switch means for operating the latter.

10. Image projection apparatus comprising:
video amplifier means having an input terminal selectively supplied with first and second modes of video signals having a standard aspect ratio and a non-standard aspect ratio, respectively;
a cathode ray tube including a picture screen of standard aspect ratio and in which an electron beam modulated with video signals from said amplifier means is directed against said screen;
deflection means for deflecting said electron beam so as to scan said picture screen in a raster for forming an image on said picture screen;
deflection width control means connected to said deflection means for selectively changing the horizontal deflection width of said electron beam in said cathode ray tube upon a change in the mode of said video signals supplied to said amplifier means, said control means having a first stage for said first mode of video signals providing a first raster of standard aspect ratio with a height and a width of said first raster being less than the height and width, respectively, of said picture screen, and said control means having a second state for said second mode of video signals providing a second raster of said non-standard aspect ratio with the height of said second raster being substantially the same as said height of the first raster and the width of said second raster being substantially the same as said width of the picture screen;
a projection screen having an aspect ratio which is substantially larger than said standard aspect ratio; and
projection lens means for projecting onto said projection screen said image formed on said picture screen, said projection lens means enlarging the projected image so that the height of the latter substantially corresponds to the height of said projection screen when video signals of said first mode are supplied to said amplifier means and said deflection width control means is in said first state, and so that the height and width of the projected image substantially correspond to the height and width, respectively, of said projection screen when video signals of said second mode are supplied and said deflection width control means is in said second state.

* * * * *